(12) United States Patent
Asuncion

(10) Patent No.: US 10,795,112 B2
(45) Date of Patent: Oct. 6, 2020

(54) FOCAL PLANE SHIFT MEASUREMENT AND ADJUSTMENT IN A LENS ASSEMBLY

(71) Applicant: GoPro, Inc., San Mateo, CA (US)

(72) Inventor: Bryan C. Asuncion, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 780 days.

(21) Appl. No.: 15/380,796

(22) Filed: Dec. 15, 2016

(65) Prior Publication Data

US 2018/0176451 A1 Jun. 21, 2018

(51) Int. Cl.
| | |
|---|---|
| *G02B 7/02* | (2006.01) |
| *H04N 5/225* | (2006.01) |
| *H04N 17/00* | (2006.01) |
| *G02B 7/08* | (2006.01) |
| *G02B 13/16* | (2006.01) |
| *H04N 5/217* | (2011.01) |

(52) U.S. Cl.
CPC .............. *G02B 7/028* (2013.01); *G02B 7/08* (2013.01); *G02B 13/16* (2013.01); *H04N 5/217* (2013.01); *H04N 5/2254* (2013.01); *H04N 17/002* (2013.01)

(58) Field of Classification Search
CPC .......... G02B 7/028; G02B 13/16; G02B 7/08; H04N 5/217; H04N 17/002; H04N 5/2254

See application file for complete search history.

(56) References Cited

U.S. PATENT DOCUMENTS

| | | | |
|---|---|---|---|
| 2006/0215283 A1* | 9/2006 | Makii | G02B 7/023 359/824 |
| 2009/0310107 A1* | 12/2009 | Sato | G03B 27/42 355/53 |
| 2014/0091204 A1* | 4/2014 | Ezawa | H04N 5/335 250/208.1 |
| 2016/0037023 A1* | 2/2016 | Chen | H04N 5/2258 348/175 |

\* cited by examiner

*Primary Examiner* — Timothy J Henn
(74) *Attorney, Agent, or Firm* — Young Basile Hanlon & MacFarlane, P.C.

(57) ABSTRACT

To compensate for this change in focal length due to a temperature change, an integrated image sensor and lens assembly includes a shift measurement module to measure a shift between optical elements to which the shift measurement module is coupled. The measured shift between optical elements is used to determine a shift of the focal plane in reference to the image plane. Optical aberration resulting from the shift of the focal plane in reference to the image plane may further be compensated.

15 Claims, 4 Drawing Sheets

FOCAL PLANE SHIFT MEASUREMENT AND ADJUSTMENT IN A LENS ASSEMBLY

TECHNICAL FIELD

This disclosure relates to a camera, and more specifically, to an integrated sensor and lens assembly of a camera.

BACKGROUND

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In an integrated image sensor and camera lens system, a lens mount is coupled to a lens barrel. In an assembly process, a lens barrel housing the camera lens (or multiple lenses) is placed within a housing assembly affixed to an image sensor such that the image sensor is properly aligned with the lens to maintain lens focus. Upon testing the lens barrel to position it for proper alignment, the lens barrel is affixed to the housing assembly. Imaging lenses tend to defocus due to various reasons such as temperature change or physical movement. For example, coefficient of thermal expansion (CTE) changes the physical scale in materials. CTE changes may cause the lens system to move. An individual lens may move with respect to one another and alter the physical dimensions of the lens. In addition, thermo-optic coefficient changes the refractive index of optical materials. Thermal expansion of lens assemblies cause changes in optical path lengths, which defocuses images when a camera is used in a temperature range other than the one under which the camera has been tuned. This affects the focus of the lenses and compromises performance and yield. This effect is especially detrimental to a high definition camera as the sensor is able to resolve details at the very limit of the optical focus and any defocusing is readily captured and appreciably degrades the picture quality.

BRIEF DESCRIPTION OF THE DRAWINGS

The teachings of the present disclosure can be readily understood by considering the following detailed description in conjunction with the accompanying drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An integrated image sensor and lens assembly is described herein. The integrated image sensor and lens assembly may include a lens barrel holding one or more lenses coupled to a lens mount. The lens mount may further be coupled to an image sensor substrate that has an image sensor lying on an image plane. During an assembly process, the optical distance between the camera lens and the image sensor may be tuned such that the focal plane of the camera lens coincides with the image plane. However, in operation, due to thermal expansion of the lens barrel and the lens mount, the optical distance between the lens window and the image sensor may vary with temperature change thereby causing the focal plane of the camera lens to shift from the image plane. To compensate for this change in focal length due to a temperature change, the integrated image sensor and lens assembly may further comprise a shift measurement module to measure a shift between a lens and an image sensor, two lenses, a lens window and an image sensor, or a lens window and a lens. The shift measurement module may include one or more strain gauges of which an electrical resistance changes responsive to a shift among optical elements. The measured shift may be used to determine a shift of a focal plane in reference to the image plane. Optical aberration resulting from the shift of the focal plane in reference to the image plane may accordingly be compensated.

Example Integrated Image Sensor and Lens Assembly

Figure 1:
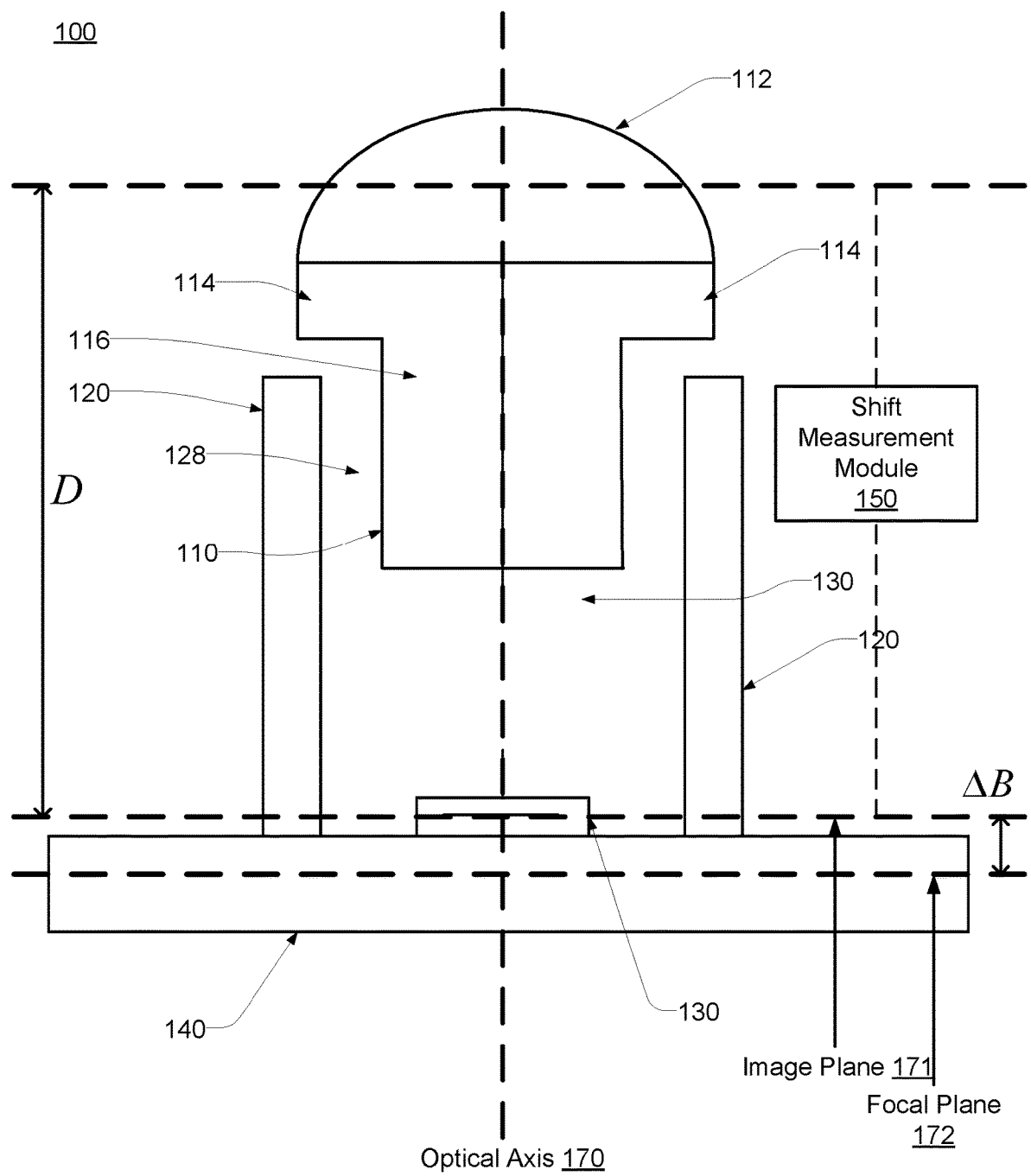
FIG. 1 illustrates a cross-sectional view of an example integrated image sensor and lens assembly, according to one embodiment.

FIG. 1 illustrates a cross-sectional view of an embodiment of an integrated image sensor and lens assembly 100. The assembly 100 may include a camera lens barrel 110, a camera lens mount 120, an image sensor substrate 140, and a shift measurement module 150. The image sensor substrate 140 may have an image sensor assembly 130 (e.g., a high-definition image sensor) for capturing images (e.g., still images and/or video frames). The camera lens mount 120 may be physically affixed to the image sensor substrate 140 and also affixed to the camera lens barrel 110.

The lens barrel 110 may include one or more lenses or other optical components to direct light to the image sensor assembly. The lens barrel 110 may comprise a lower portion 116, one or more barrel arms 114, and a lens window 112. The lower portion 116 of the lens barrel is substantially cylindrical and structured to at least partially extend into the channel of the tube portion 128 of the camera lens mount 120. The barrel arms 114 extend radially from the body of the lens barrel 110 and are outside the channel of the lens mount 120 when assembled. The lens arms 114 may be used to physically couple the lens barrel 110 to the camera body (not shown). The lens window 112 includes optical components to enable external light to enter the lens barrel 110 and be directed to the image sensor assembly 130. The camera lens mount 120 includes a tube portion 128 that extends away from the image sensor assembly along the optical axis 170 and includes a substantially cylindrical channel for receiving the lens barrel 110.

The image sensor substrate 140 comprises a printed circuit board for mounting the image sensor assembly 130 and may furthermore include various electronic components that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to the camera lens mount 120. The image sensor of the image sensor assembly 130 lies on an image plane 171. The combined focal plane of the lens window 112 and lenses internal to the lens barrel 116 is maintained to coincide with the image plane 171. The distance between the lens window 112 and the image sensor 130 is D. As illustrated, the lens barrel 110 and/or lens mount 120 expand or contract with temperature and cause a shift ΔB of a focal plane in reference to an image plane.

The shift measurement module 150 measures shifts between optical elements. In the illustrated example, the shift measurement module 150 is coupled between the lens window 112 and the image sensor 130. The shift measurement module 150 measures a shift between the lens window 112 and the image sensor 130. The shift measurement module 150 may be further coupled between the lens window 112 and a lens, between the lens and the image sensor 130, and/or between two lenses.

In one embodiment, the shift measure module 150 includes one or more strain gauges. An electrical resistance of the strain gauge changes responsive to a shift between the lens window 112 and the image sensor 130. A change in the electrical resistance of the strain gauge is measured. In various embodiments, the change in the electrical resistance of the strain gauge is converted to the shift ΔD between the lens window 112 and the image sensor 130. A shift ΔB of the image plane 171 in reference to the focal plane 172 can be determined based on the shift ΔD between the lens window 112 and the image sensor 130. For example, a shift ΔB between the image plane 171 and the focal plane 172 can be determined by looking up a shift ΔD between the lens window 112 and image sensor 130 in a table including values of ΔD and corresponding values of ΔB. As such, changes in the position of the focal plane (which results in a defocused image) caused, for example, by thermal expansion of the lens barrel 110 and/or lens mount 120 can be determined. The camera may compensate optical aberration as a result of a focal plane from an image plane.

Figure 2A:
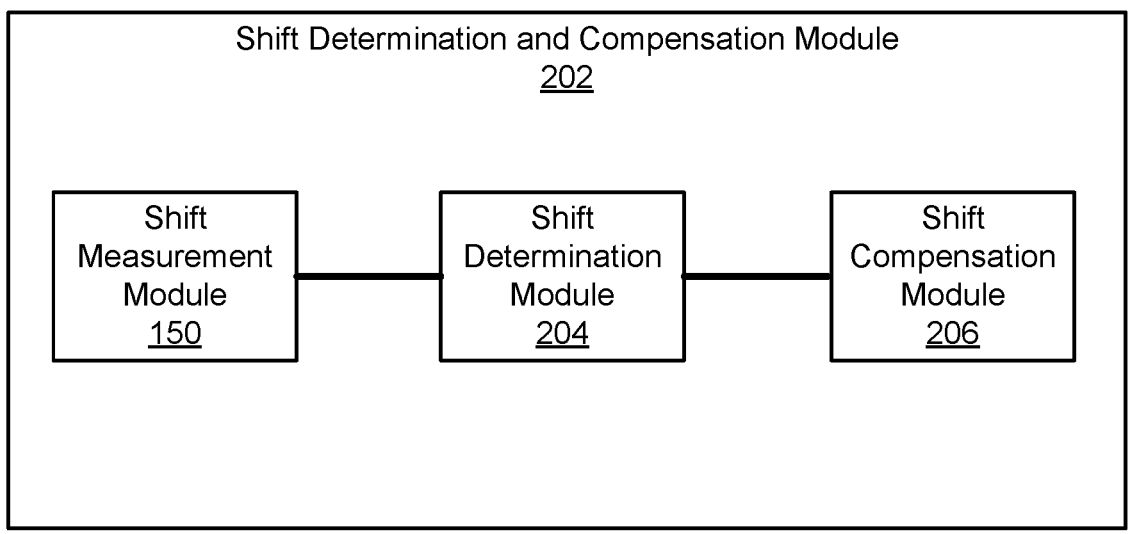
FIG. 2A illustrates an example shift determination and compensation module, according to one embodiment.

FIG. 2A illustrates an example shift measurement and compensation module 202, according to one example embodiment. The shift measurement and compensation module 202 determines a shift of a focal plane in reference to an image plane and compensates the shift such that the image is focused. The shift of the focal plane in reference to the image plane may result in optical aberration (e.g., monochromatic aberration, chromatic aberration), and the shift measurement and compensation module 202 can correct for the optical aberration. As such, the image remains focused or substantially focused. The shift determination and compensation module 202 includes a shift measurement module 150, a shift determination module 204, and a shift compensation module 206.

The shift measurement module 150 may measure one or more shifts. The one or more shifts may include a shift between a lens window and an image sensor. The one or more shifts may include a shift between a lens and an image sensor, a shift between a lens window and a lens, and/or a shift between two lenses. The shift measurement module 150 may include one or more strain gauges. The set of strain gauges may be integrated in the integrated image sensor and lens assembly, as illustrated in FIG. 1. The shift measurement module 150 measures one or more resistance changes caused by the one or more shifts. The shift measurement module 150 converts the measured one or more resistance changes to the one or more shifts between a lens window and an image sensor, between a lens and an image sensor, between the lens window and the lens, or between two lenses.

The shift determination module 204 may determine a shift of a focus plane in reference to an image plane based on the one or more shifts measured by the shift measure module 150. The shift determination module 204 looks up the one or more measured shifts in a table to determine a shift of a focal plane in reference to the image plane. The table stores values of shifts between optical elements and values of a shift of the focal plane in reference to the image plane that correspond to the values of shifts between optical elements. A shift of the focal plane in reference to the image plane may result in an optical aberration.

The shift compensation module 206 may correct for the optical aberration resulting from the shift of the focal plane in reference to the image plane. For example, the shift compensation module 206 uses one or more digital image processing techniques to correct for the optical aberration. As a shift of the focal plane away from the image plane has been determined, the optical aberration can also be determined. Images are processed using various techniques to substantially minimize the determined optical aberration. For example the shift of the focal plane in reference to the image plane may cause the captured images that are out of focus. The captured images are processed to restore focus.

Figure 2B:
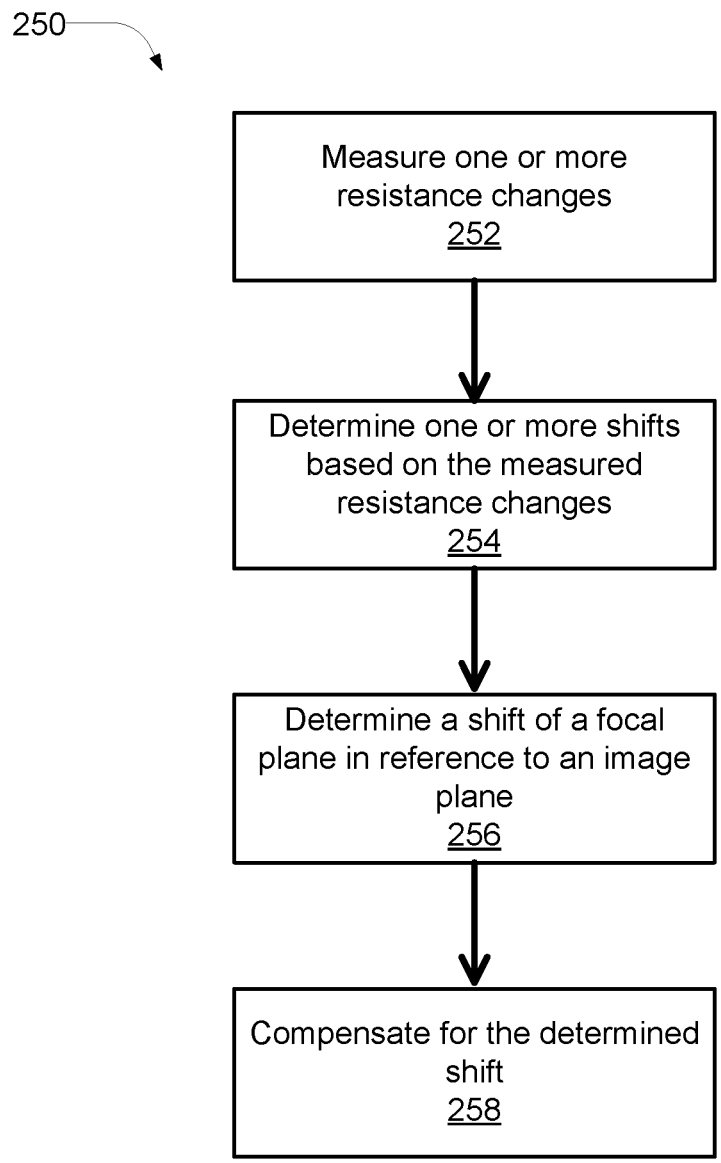
FIG. 2B illustrates an example processing of measuring and compensating a shift of a focal plane from an image plane, according to one embodiment.

FIG. 2B illustrates an example process 250 of a camera measuring and compensating a shift of an optical plane from an image plane, according to one example embodiment. The camera may measure 252 one or more resistance changes due to one or more shifts between a lens window and an image sensor, between a lens and the image sensor, between the lens window and the lens, and/or between two lenses. The camera 252 may include one or more strain gauges. The one or more strain gauges may be coupled between the lens window and the image sensor, the lens window and a lens, two lenses, and/or a lens and the image sensor. The camera may determine 254 the one or more shifts between a lens window and an image sensor, between a lens and the image sensor, between the lens window and the lens, and/or between two lenses. The camera may convert the measured one or more resistance changes to determine the one or more shifts. The camera may further determine 256 a shift of a focal plane in reference to an image plane. The camera may look up the measured one or more shifts in a table to identify a corresponding shift of a focal plane in reference to the image plane. The table stores a one to one relationship between a shift of a focal plane from the image plane and one or more shifts. The camera may compensate for 258 the determined shift of the focal plane in reference to the image plane. In some embodiments, the camera may compare the determined shift of the focal plane in reference to the image plane to a threshold shift. The camera may compensate for the determined shift in response to determining that the determined shift exceeds the threshold shift. The camera may use one or more image processing techniques to correct for the optical aberration resulting from the shift of the focal plane in reference to the image plane.

Example Camera System Configuration

Figure 3:
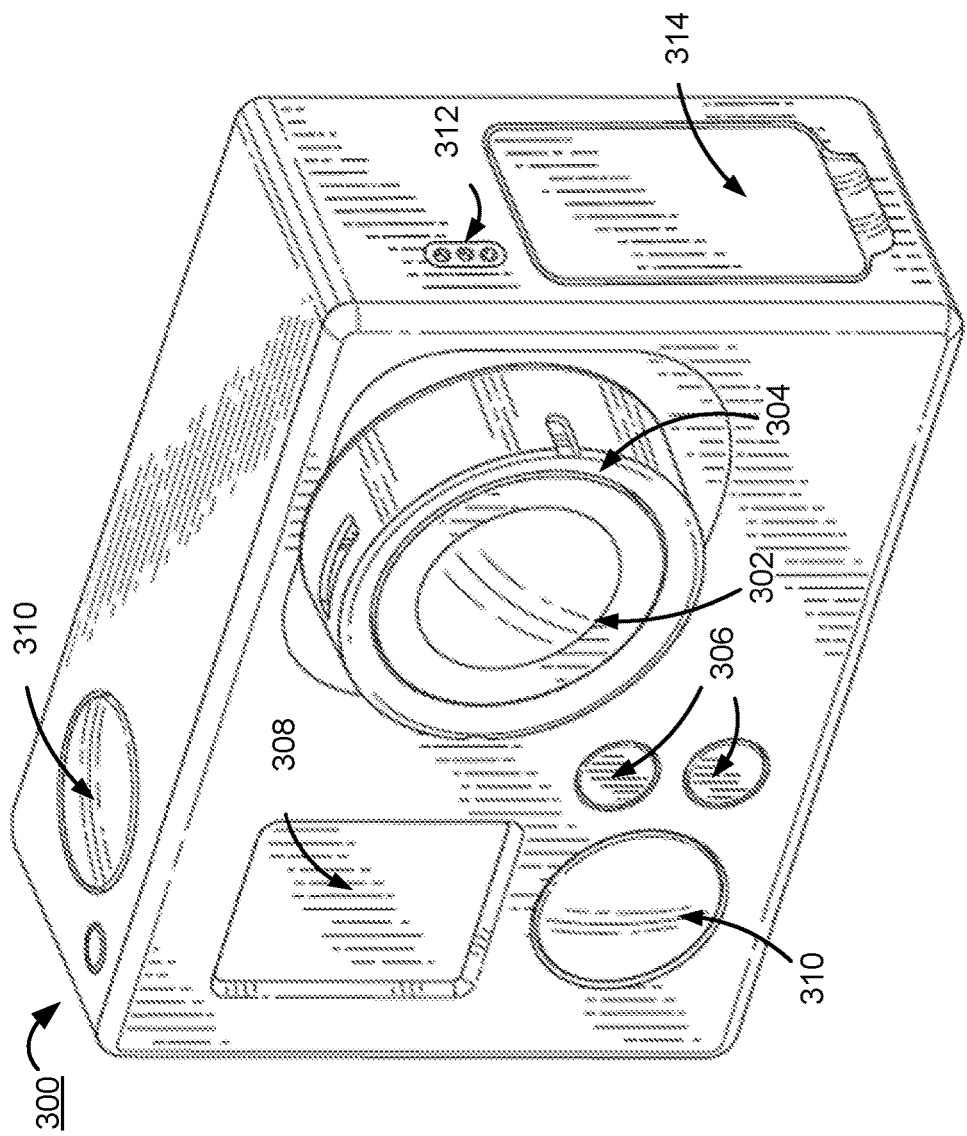
FIG. 3 illustrates an example camera that includes an integrated image sensor and lens assembly, according to one embodiment.

FIG. 3 illustrates an embodiment of an example camera 300 that includes the integrated image sensor and lens assembly 100 described above. The camera 300 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera 300 is configured to capture images and video, and to store captured images and video for subsequent display or playback. As illustrated, the camera 300 includes a lens 302 configured to receive light incident upon the lens and to direct received light onto an image sensor internal to the lens. The lens 302 is enclosed by a lens ring 304, which are both part of the integrated image sensor and lens assembly 100 discussed above.

The camera 300 can include various indicators, including the LED lights 306 and the LED display 308. The camera 300 can also include buttons 310 configured to allow a user of the camera to interact with the camera, to turn the camera on, and to otherwise configure the operating mode of the camera. The camera 300 can also include a microphone 312 configured to receive and record audio signals in conjunction with recording video. The side of the camera 300 includes an I/O interface 314.

Additional Configuration Considerations

Various embodiments as presented herein can advantageously measure focal length changes due to thermal expansion or contraction of the lens barrel and/or lens mount due to temperature changes and correct for optical aberration resulting from the focal length changes. The configurations as described herein can correct for optical aberration efficiently without compromising cameras' compact sizes.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated sensor and lens assembly, comprising:
   an image sensor;
   a lens mount coupled to the image sensor;
   a lens barrel secured by the lens mount, the lens barrel comprising one or more lenses along an optical axis substantially perpendicular to a focal plane; and
   one or more strain gauges, a strain gauge of the one or more strain gauges coupled between a lens and the image sensor and structured to measure a shift in a direction along the optical axis between the lens and the image sensor.

2. The integrated sensor and lens assembly of claim 1, wherein a second strain gauge of the one or more strain gauges is coupled between a first lens and a second lens of the one or more lenses and structured to measure a second shift in a direction along the optical axis between the first lens and second lens.

3. The integrated sensor and lens assembly of claim 1, wherein an electrical resistance of the strain gauge changes responsive to the shift and the electrical resistance change is converted to the shift in a direction along the optical axis between the lens and the image sensor.

4. The integrated sensor and lens assembly of claim 1, wherein the shift in the direction along the optical axis between the lens and the image sensor is used to determine a shift in a direction along the optical axis between the focal plane and an image plane.

5. An integrated image sensor and lens assembly comprising:
   an image sensor substrate comprising an image sensor in an image plane;
   a lens mount comprising a tube portion extending in a direction of an optical axis substantially perpendicular to the image plane, the tube portion having a channel;
   a lens barrel having a first portion extending into the channel of the tube portion, and a second portion outside the channel of the tube portion, the second portion having a camera lens window; and
   one or more strain gauges, a strain gauge of one or more strain gauges is coupled between the lens window and the image sensor and structured to measure a shift in a direction along the optical axis between the lens window and the image sensor.

6. The integrated image sensor and lens assembly of claim 5, wherein the lens barrel comprises one or more lenses and wherein a second strain gauge of the one or more strain gauges is coupled between a first lens and a second lens of the one or more of lenses and configured to measure a second shift in a direction along the optical axis between the first lens and the second lens.

7. The integrated image sensor and lens assembly of claim 5, wherein the lens barrel comprises one or more lenses and a second strain gauge of the one or more strain gauges is coupled between a lens and the lens window and configured to measure a second shift in a direction along the optical axis between the lens window and the lens.

8. The integrated image sensor and lens assembly of claim 5, wherein the lens barrel comprises one or more lenses and a second strain gauge of the one or more strain gauges is coupled between a lens and the image sensor and configured to measure a second shift in a direction along the optical axis between the lens and the image sensor.

9. A camera comprising:
one or more strain gauges;
an integrated image sensor and lens assembly comprising:
an image sensor substrate comprising an image sensor in an image plane;
a lens mount comprising a tube portion extending in a direction of an optical axis substantially perpendicular to the image plane, the tube portion having a channel; and
a lens barrel having a first portion extending into the channel of the tube portion, and a second portion outside the channel of the tube portion, the second portion having a camera lens window;
wherein a strain gauge of the one or more strain gauges is coupled between the lens window and the image sensor and structured to measure a shift in a direction along the optical axis between the lens window and the image sensor.

10. The camera of claim 9, wherein the lens barrel comprises one or more lenses and wherein a second strain gauge of the one or more strain gauges is coupled between a first lens and a second lens of the one or more of lenses and configured to measure a second shift in a direction along the optical axis between the first lens and the second lens.

11. The camera of claim 9, wherein the lens barrel comprises one or more lenses and a second strain gauge of the one or more strain gauges is coupled between a lens and the lens window and configured to measure a second shift in a direction along the optical axis between the lens window and the lens.

12. The camera of claim 9, wherein the lens barrel comprises one or more lenses and a second strain gauge of the one or more strain gauges is coupled between a lens and the image sensor and configured to measure a second shift in a direction along the optical axis between the lens and the image sensor.

13. A method, comprising:
measuring an electrical resistance change of a strain gauge coupled between a lens and an image sensor of a camera;
converting the measured electrical resistance to a shift between the lens and the image sensor of the camera;
determining a shift between an image plane and a focal plane of the camera based on the shift between the lens and the image sensor of the camera; and
correcting for optical aberration resulting from the determined shift between the image plane and the focal plane of the camera.

14. The method of claim 13, wherein the step of determining the shift comprises looking up the shift between the lens and the image sensor of the camera in a table to determine the shift between the image plane and the focal plane of the camera.

15. The method of claim 13, wherein the correcting for optical aberration comprises determining the optical aberration based on the determined shift and applying one or more image processing techniques to substantially minimize the determined optical aberration.

* * * * *